Aug. 13, 1963  A. H. MERKER  3,100,438
UNIVERSAL PRESS
Filed Jan. 30, 1961  2 Sheets-Sheet 1
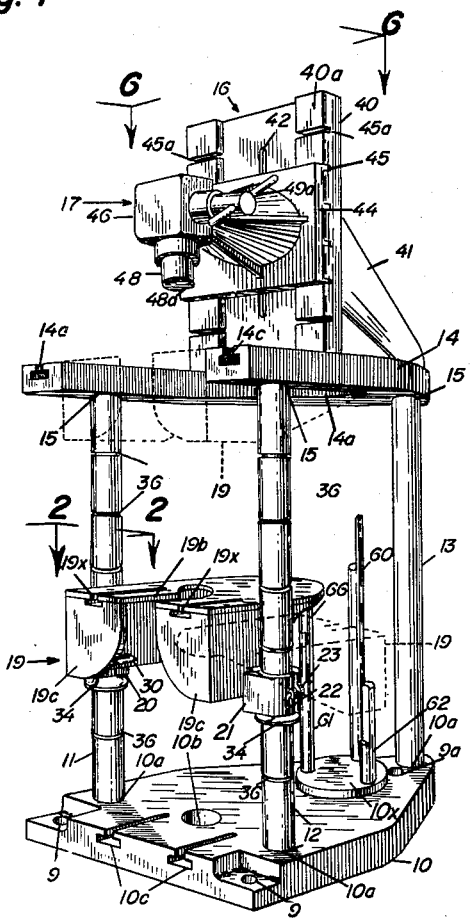
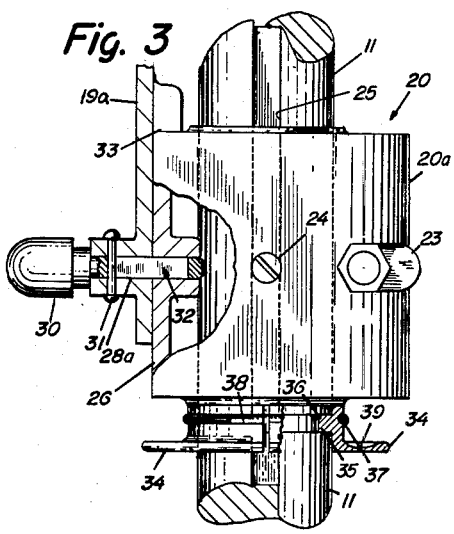
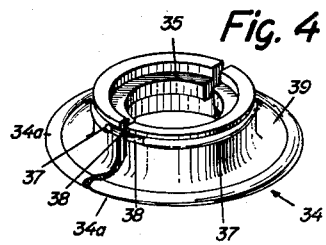
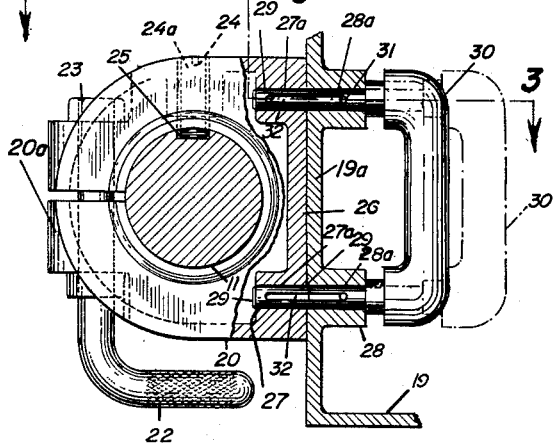
INVENTOR
Alfred H. Merker
by Eugene E. Stevens and/or
Raymond H. Stevens
ATTORNEYS Aug. 13, 1963 A. H. MERKER 3,100,438
UNIVERSAL PRESS
Filed Jan. 30, 1961 2 Sheets-Sheet 2

INVENTOR
Alfred H. Merker
by Eugene E. Stevens and/or
Raymond H. Stevens
ATTORNEYS

United States Patent Office 3,100,438
Patented Aug. 13, 1963

3,100,438
UNIVERSAL PRESS
Alfred H. Merker, 978 Acalances Road, Lafayette, Calif.
Filed Jan. 30, 1961, Ser. No. 85,761
17 Claims. (Cl. 100—214)

My invention relates to improvements in work holding presses for machine shops.

Briefly and generally stated, the invention has for its primary object to provide what may be termed a universal press in that it can be readily converted for use as either an arbor press or a drill press, the device being particularly suitable for handling elongated work pieces.

Another object is to provide in a press as characterized, upper, lower and intermediate work supports, with the intermediate work-support vertically adjustable, and also mounted to be swung laterally out of the way when not in use; the intermediate work-support being further adapted to combine with the top work support to provide a work-supporting table.

A further object of the invention is to provide a multiple position indexing and supporting means for the aforementioned vertically adjustable work-supporting member, and which indexing means is removable so as to be out of the way when said adjustable work-supporting member is not in use.

Further, the invention contemplates a press wherein an upper work-support provides a mount for a drill head adapter when the device is used as a drill press; and which mount is adapted to carry a bracket on which a ram-operating head adapter is adjustably supported when the unit is to function as an arbor press.

An additional aim of the invention, in its arbor phase, is to furnish a novel work head adapter and supporting bracket assembly, whereby the work head adapter will be conveniently mounted for ready vertical adjustment in respect to the bracket and fixedly retained in different adjusted positions.

It is also an object of the invention to provide in a drill or arbor press, a novel vertically shiftable and outwardly swingable work-supporting table element, and novel means for supporting same in operative position with respect to a drill or work head carried ram and to retain it against outward swinging.

Invention also resides in certain detailed features of construction, combination and arrangement of the various parts, and in modes of operation of same, as will be readily understood and appreciated by those versed in the art upon reference to the accompanying drawings in connection with the detailed description thereof to follow.

In conformity with statutory requirements, I have illustrated herein a now preferred example of the invention. However, it is to be understood that what is shown in the drawings is to be taken as merely illustrative rather than limitative, since it will be obvious that my inventive concept is susceptible of other mechanical expressions within the spirit and scope of the subject matter claimed hereinafter.

In the drawings, wherein the same reference characters have been used to designate the same parts wherever they appear in the several views—

FIG. 1 is a perspective view of my universal press, converted for arbor press use with the vertically adjustable work head adapter and its supporting bracket in place on the upper work holder member, with which latter a vertically shiftable work support member cooperates, as indicated in dotted lines, to provide an upper work-supporting table;

FIG. 2 is a detail view of the detachable supporting lug for the slidable work-supporting member, the view being taken on the line 2—2 of FIG. 1 and with certain bearing portions for the clamp lug-securing pins, broken away and shown in section;

FIG. 3 is another detail view taken on the line 3—3 of FIG. 2;

FIG. 4 is a perspective view of one of the thrust collars shown in FIGS. 1 and 3;

FIG. 9 is a fragmentary side elevational view of the work head adapter and its supporting bracket.

Figure 5:
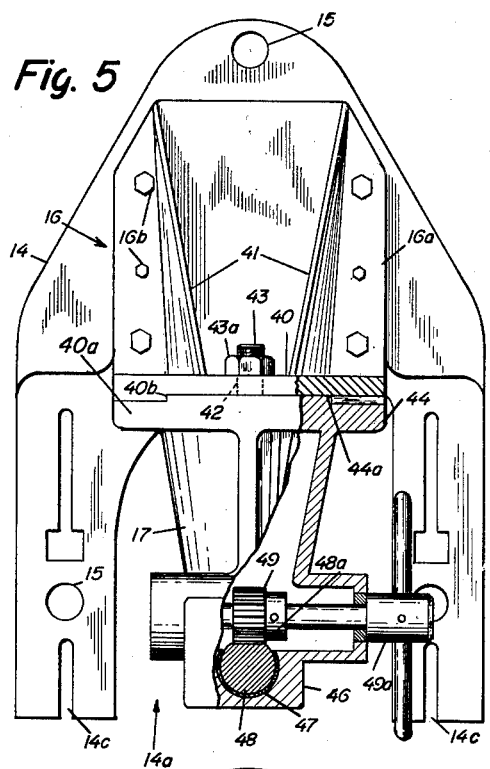
FIG. 5 is a top plan view partly broken and partly in section, and showing the upper work-supporting member of FIG. 1 removed from its supporting posts and showing the adjustable and separable connection of the work head adapter with its supporting bracket.

Referring to the drawings by reference characters, and turning to FIG. 1, it will be seen that the pedestal type press shown provides the work holding base 10 which has the transverse bolt receiving holes 9, 9a so that it can be bolted to a floor or other supporting surface. A base-provided work-locating hole 10b, and the usual T-slots 10c for work-holding means are also shown.

Rising from seats 10a in the base 10 are the posts 11, 12, 13 which support an upper work-holding table element 14 whose forward end is U-form to provide the frontally opening recess 14a. Table element 14 has the T-grooves 14c for work-holding elements. The upper ends of posts 11, 12 and 13 seat in holes 15 in the under surface of member 14, as shown.

Also shown in FIG. 1 is a removable and rotatably adjusted disk form indexing plate 10x. This indexing plate 10x has posts which cooperate in the support of a superjacent table element member 19, as will be explained hereinafter.

The rear portion of table element 14 provides the mounting pad 14b (FIG. 6) which, when the unit is in use as an arbor press as in FIG. 1, detachably carries the base 16a of a bracket 16 which latter mounts, for vertical adjustment, a work head adapter 17. Machine screws 16b or the like secure base 16a to pad 14b, best shown in FIG. 5.

Figure 6:
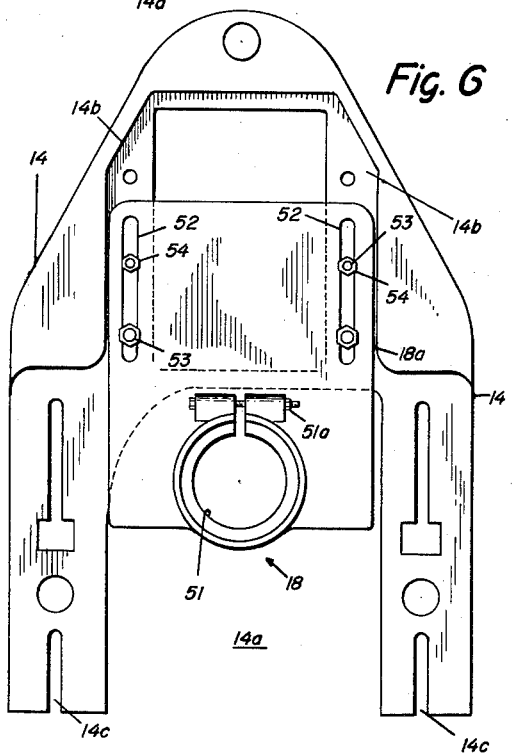
FIG. 6 is a top plan view illustrating a drill head adapter mounted on the upper work support, in lieu of the work head adapter of FIGS. 1 and 5.

It should be stated here, however, that when the unit is used as a drill press, as in FIG. 6, the mounting pad 14b of member 14 supports the base 18a of a drill head adapter 18.

Also incorporated in the invention is an intermediate work-holding table element 19 to which incidental reference has been made earlier herein. This intermediate table element 19 is slidably carried by the forward posts 11, 12 for movement between base 10 and the upper table element 14. As shown, table element 19 has depending sides 19a, front wall portions 19c, a forwardly opening work-receiving opening 19b, and forwardly opening T-grooves 19x for conventional work securing means.

In the use of the device, particularly as an arbor press, as shown in FIG. 1, the intermediate work-holding member 19 may cooperate with one of the other or both of the base 10 and upper table element 14 in supporting a work piece. Also, as suggested in dotted lines in FIG. 1, the intermediate table element 19 is movable into the recess 14a of the upper table element 14 to complete a table form work support.

Still referring to the intermediate work-holding table unit-providing member 19, it is to be noted, as indicated in dotted lines in FIG. 1, that it can, as will be presently explained, be disconnected from the frontal post 11, and swung bodily out of the way about the companion frontal post 12 as an axis.

Coming now to the means for slidably mounting the intermediate work-holding member 19 and providing for the above mentioned outward swinging of same as shown in dotted lines in FIG. 1, it will be noted that the sides 19a of member 19 have connected thereto the combined split type clamp and guide lugs 20 and 21 through which the respective posts 11 and 12 extend. Clamp screws 22 working through opposed and separated portions of the respective lugs 20, 21 (see FIG. 2) and cooperating with nuts 23, enable member 19 to be secured in selected positions. The clamp lug 21 through which post 12 extends is a functionally integral part of the related side portion 19a of the intermediate member 19 but the clamp lug 20 is detachably connected to the opposite side of member 19 to admit of the outward swinging movement mentioned.

Turning now to FIGS. 2 and 3, which illustrate the means for detachably connecting the clamp lug 20 to the side wall 19a of member 19, one side of lug 20 is shown in FIG. 2 as having a transverse bore 24a into which is threaded the set screw 24 whose inner end slidably engages in the longitudinal groove 25 of the post 11. The reason for this lug and groove arrangement 24, 25 is to maintain the wall surface 26 of lug 20 substantially in plane with the outer surface of the side wall 19a of member 19 so that the laterally spaced pairs of transverse bores 27a, 28a of lug 20 and the side 19c of member 19, respectively, can be readily aligned to receive coupling pins 29.

FIG. 2 also shows that bores 27a, 28a are provided by the respective bearing portions 27 and 28 of the lug 20 and the side wall 19a of member 19, and that the rear ends of said pins 29, inwardly of wall 19a are connected by an operating handle 30. Pins 29 also have closed longitudinally extending transverse slots 32 through which extend keeper pins 31 carried by the table element (19) provided bearings 28. This is so as to maintain assembly of the pins 31 with the table element 19.

In the use of the device, particularly as an arbor press for different work pieces, the sliding work-supporting table element 19 will frequently be required to be set at different predetermined elevations with respect to base 10. For this reason and also to provide for quick shifts of member 19 from one position to another, it is desirable to provide means for supporting said table element 19 in a selected position independently of the frictional clamping action of lugs 20, 21 on posts 11, 12. In carrying out this phase of the invention, I provide the posts 11, 12 with sectional thrust collars 34 for the support of table element 19 sustaining lugs 20, 21. These thrust collars 34 may be employed in conjunction with or independently of the earlier mentioned index plate 10x and upstanding indexing posts.

As shown in FIGS. 3 and 4, the thrust collars 34 comprise duplicate ring halves 34a which have the inwardly extending load-sustaining flanges 35 for selective engagement in the annular longitudinally spaced transverse grooves 36 of posts 11, 12. The halves 34a of each thrust collar 34 are maintained in operative post engaging position by a coil spring 37 seated in the exterior collar-provided groove 38. As shown, the thrust collar sections 34 provide the outwardly extending finger grip-providing portions 39. By use of finger grip portions 39, related sections 34a can be readily pulled outwardly in opposite directions against the action of the associated spring 37 when it is desired to shift the collar 34 from one groove (36) setting to another.

Referring to FIGS. 1 and 5, and to the bracket 16 for supporting the work head adapter 17, said bracket 16 provides, in addition to base 16a, the upstanding base-carried frontal wall 40 which is sustained in upright position by the two rear-wardly extending and laterally spaced base-carried braces 41.

As indicated in FIGS. 1 and 5, upstanding frontal wall 40 of bracket 16 provides in the forwardly facing guideway 40b intermediate its thickened longitudinally coextensive side portions 40a, the closed longitudinally extending slot 42. Extending through this slot 42 is the securing bolt 43 which projects outwardly from the midpart of the rectangular boss-like portion 44a of the base 44 of the work head adapter 17 and receives nut 43a.

FIGS. 1 and 5 also show that each side margin-adjacent rear surface of the base 44 of the work head adapter 17 has a series of spaced transverse cleats 45 for selective engagement with the vertically spaced transverse grooves 45a in the side portions 40a of bracket wall 40.

Thus, the work head adapter, as will be understood, is adjustable in bracket wall guideway 40b. The engaged cleats 45 and grooves 45a not only function to locate the adapter 17 in a set position while nut 43a is being tightened upon bolt 43, but also make the bolt 43 substantially load free in service.

The work head adapter 17 provides the ram assembly-carrier portion 46 extending forwardly from its base 40, said portion 46 providing the guide bearing 47 for the ram element 48. Ram element 48 has the rack teeth 48a which are engaged by the actuating pinion 49 which is controlled by the hand operated shaft 49a. As will be understood, the work engaging ram assembly, per se, forms no part of the present invention.

Figure 7:
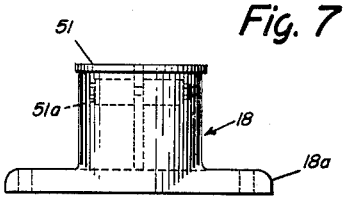
FIG. 7 is a front elevational view of the drill head adapter shown in FIG. 6.

Referring to the previously mentioned drill head adapter 18 of FIGS. 6 and 7, it has the split clamp collar 51 controlled by a screw 51a for a drill head (not shown). The base 18a of drill head adapter 18 has closed side margin-adjacent slots 52 for machine screws 53 which adjustably secure it to the mounting pad 14b of the upper table element 14.

Figure 8:
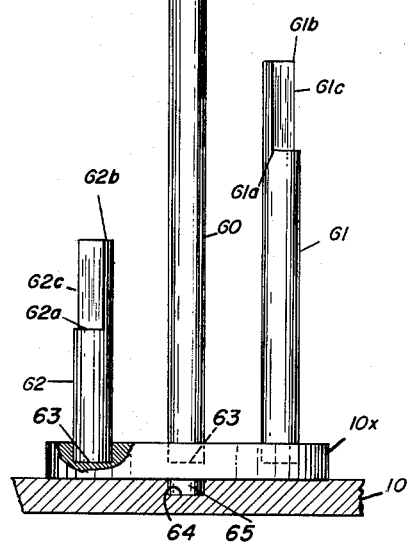
FIG. 8 is an elevational detail view, partly in section illustrating the use of the indexing plate and posts of FIG. 1.

Referring to the earlier mentioned position indexing disk 10x for the vertically shiftable table element 19, said disk is shown as having three margin-adjacent and upstanding indexing bars 60, 61 and 62 of different lengths which are circumferentially spaced from one another equal distances. Commencing at their upper ends 60b, 61b, 62b, the respective indexing bars are reduced to approximately one half (½) thickness to provide flat faces 60c, 61c, 62c, respectively, of equal length and which terminate in the respective shoulders 60a, 61a, 62a, Each of the above mentioned indexing bars 60, 61, 62 has its lower end rotatably journalled in a bearing hole 63 in disk 10x as shown in FIG. 8. FIG. 8 also shows the indexing disk 10x as having a concentric pilot bearing 65 projecting from its lower face and rotatably received in the bearing hole 64 in the top of base member 10. This disk 10x is removably and rotatably mounted on base 10.

FIG. 1 also discloses the rear end of the vertically shiftable table element 19 as having a fixedly depending and centrally located bar 66. As shown in FIG. 8, the table element carried bar 66 is reduced to about one half thickness commencing at its lower end to provide a flat face 66c which terminates in a shoulder 66a. Face 66c corresponds in length with the lengths of the flat faces of the disk-provided bars.

As will be understood from FIGS. 1 and 8, the respective disk-provided bars 60, 61, 62 are adapted to be selectively aligned with the bar 66 of table element 19 upon partial rotation of disk 10x. When any one of the upstanding disk-provided bars 60, 61, 62 is aligned with the table element-provided bar 66, the other two disk-provided bars will be disposed rearwardly of the plane of the rear end of table element 19, as indicated in FIG. 1. Thus, the table element 19 can be lowered to engage its bar 66 with the aligned disk-carried bar such as 61 in FIG. 1 (or 60, FIG. 8). A functionally integral support for the rear end of the shiftable table element 19 is thus provided whether the aligned bar ends 66a, 60b are engaged (FIG. 8) or whether there is a shoulder and end joint-providing engagement 60a, 66b, 66a as in FIG. 1.

From the foregoing description, read in connection with the accompanying drawings, it is believed that the construction, operation and advantages of my novel press will be readily understood and appreciated.

When the device is used as an arbor press as in FIG. 1, elongated work pieces may be secured by conventional means to the base 10, intermediate and upper work holders 19, 14, respectively. Also the intermediate work holder 19 can be adjusted to cooperate with either the base 10 or upper work holder 14 to support a piece of work; or it can be swung out of the way, as suggested in dotted lines in FIG. 1, when not needed.

Likewise, when the intermediate work support is not in use, the indexing plate 10x is simply removed. Use of indexing plate 10x is, of course, optional. However, it does cooperate with the collar 34 and post grooves 36 to define six positions of adjustment of work holder 19, and it also supports the rear end of work support 19.

It is a simple matter to free the work support 19 for outward swinging about post 12, by simply pulling the pin coupling 30 to the right as seen in FIG. 2.

When the intermediate work support 19 is not located in a position defined by post grooves 36, the guide lugs 20 and 21 will be fully tightened on posts. But otherwise use of thrust collars 34 makes such tightening unnecessary beyond what is required for a snug sliding fit on the respective posts 11, 12.

Having thus described my invention, what I claim is:

1. In a drill or arbor press for machine shops, the combination of a base member and a top member, a base member-provided supporting means spacing the top member above said base member, an intermediate vertically slidable work-supporting member between said base and top members and carried by said top member-supporting means, adjustable means supporting said intermediate member in predetermined positions between said base and top members, said top and intermediate members having aligned openings therein, a carrier for a work engaging element supported by said top member and providing a bearing for a vertically shiftable work-engaging member, said bearing being alignable with said top and intermediate member-provided openings, and said intermediate member being movable into said top member opening to cooperate with the top member in the provision of a work table.

2. The structure of claim 1, and said base member having retaining means for work-securing elements, whereby the base member can function as a work support.

3. The structure of claim 1, and said carrier-provided bearing disposed above the plane of the upper surface of said top member, and the latter having retaining means for work-securing elements, whereby the top member itself can function as a work support.

4. The structure of claim 1, and said base member having retaining means for work-securing elements, whereby the base member can function as a work support, said top member-supporting means including upstanding posts adjacent opposite sides of said base member and the adjustable intermediate member supporting means comprising collars slidable on said posts, means detachably connecting one of said collars to one side of the intermediate member, the other collar fixedly secured to the opposite side of said intermediate member and being rotatable on its post, whereby when the first mentioned collar is disconnected from the intermediate member the latter can be bodily swung outwardly clear of work that may be supported on the base member.

5. The structure of claim 1, and said top member supporting means including an index plate rotatably and removably supported by said base adjacent the plane of one edge of said intermediate member, a plurality of upstanding and substantially circumferentially spaced indexing bars of different lengths rising from said index plate for selective supporting engagement with an under portion of said intermediate member while the other indexing bars are disposed outwardly of the plane of said edge of the intermediate member.

6. The structure of claim 1, and said top member supporting means including an index plate rotatably and removably supported by said base adjacent the plane of one edge of said intermediate member, a plurality of upstanding and substantially circumferentially spaced indexing bars of different lengths rising from said index plate, a depending fixed bar carried by said intermediate member adjacent its aforementioned edge and with which depending bar said upstanding indexing bars are selectively engageable end to end to support the intermediate member while positioning the other indexing bars outwardly of the plane of said edge, said depending bar and each of the indexing bars being reduced in thickness to provide matching longitudinal bearing faces extending inwardly equal distances from their free ends and terminating in transversely extending bearing shoulders, and each of said upstanding indexing bars being rotatably carried by said index plate whereby the bearing shoulders of the respective indexing bars can be selectively brought into supporting engagement with the shoulder of said depending bar, so that each indexing bar is adapted to define two positions of elevation of said intermediate member above said base member.

7. In a drill or arbor press for machine shops, the combination of a base member and a U-shaped top member providing a bight portion of substantial depth, a base member-provided supporting means spacing the top member above said base member, an intermediate vertically slidable work-supporting member between said base and top members and carried by said top member-supporting means, adjustable means supporting said intermediate member in predetermined positions between said base and top members, said top and intermediate members having aligned openings therein, a mounting pad formed on the top surface of the bight portion of said top member adjacent the latter's opening, and a carrier for a work engaging element removably and adjustably supported on the mounting pad of said top member, means securing the carrier in adjusted positions on said mounting pad, said carrier providing a bearing for a vertically shiftable work-engaging member, whereby said bearing is alignable with different areas of said top and intermediate member-provided openings.

8. In a drill or arbor press for machine shops, the combination of a base member and a top member, a base member-provided supporting means spacing the top member above said base member, an intermediate vertically slidable work-supporting member between said base and top members and carried by said top member-supporting means, adjustable means supporting said intermediate member in predetermined positions between said base and top members, said top and intermediate members having aligned openings therein, a carrier for a work-engaging element supported by said top member and providing a bearing for a vertically shiftable work-engaging member, said bearing being alignable with said top and intermediate member-provided openings, said base member having retaining means for work-securing elements, whereby the base member can function as a work support, said top member supporting means including upstanding posts adjacent opposite sides of said base member and the adjustable intermediate member supporting means comprising collars slidable on said posts, means detachably connecting one of said collars to one side of the intermediate member, the other of said collars fixedly secured to the opposite side of said intermediate member and being rotatable on its post, whereby when the first collar is disconnected from the intermediate member the latter can be bodily swung outwardly clear of work that may be supported on the base member.

9. In a drill or arbor press for machine shops, the combination of a base member and a top member, a base member-provided supporting means spacing the top member above said base member, an intermediate vertically slidable work-supporting member between said base and top members and carried by said top member-supporting means, adjustable means supporting said intermediate member in predetermined positions between said base and top members, said top and intermediate members having aligned openings therein, a carrier for a work-engaging element supported by said top member and providing a bearing for a vertically shiftable work-engaging member, said bearing being alignable with said top and intermediate member-provided openings, said top member supporting means including an index plate rotatably and removably supported by said base adjacent the plane of one edge of said intermediate member, a plurality of upstanding and substantially circumferentially spaced indexing bars of different lengths rising from said index plate for selective supporting engagement with an under portion of said intermediate member while the other indexing bars are disposed outwardly of the plane of said edge of the intermediate member.

10. In a drill or arbor press for machine shops, the combination of a base member and a top member, a base member-provided supporting means spacing the top member above said base member, an intermediate vertically slidable work-supporting member between said base and top members and carried by said top member-supporting means, adjustable means supporting said intermediate member in predetermined positions between said base and top members, said top and intermediate members having aligned openings therein, a carrier for a work-engaging element supported by said top member and providing a bearing for a vertically shiftable work-engaging member, said bearing being alignable with said top and intermediate member-provided openings, and said top member supporting means including an index plate rotatably and removably supported by said base adjacent the plane of one edge of said intermediate member, a plurality of upstanding and substantially circumferentially spaced indexing bars of different lengths rising from said index plate, a depending fixed bar carried by said intermediate member adjacent its aforementioned edge and with which depending bar said upstanding indexing bars are selectively engageable end to end to support the intermediate member while positioning the other indexing bars outwardly of the plane of said edge, said depending bar and each of the indexing bars being reduced in thickness to provide matching longitudinal bearing faces extending inwardly equal distances from their free ends and terminating in transversely extending bearing shoulders, and each of said upstanding indexing bars being rotatably carried by said index plate whereby the bearing shoulders of the respective indexing bars can be selectively brought into supporting engagement with the shoulder of said depending bar, so that each indexing bar is adapted to define two positions of elevation of said intermediate member above said base member.

11. In a drill or arbor press for machine shops, the combination of a base member and a top member, a base member-provided supporting means spacing the top member above said base member, said top member having an opening extending therethrough, a mounting pad on the upper surface of said top member and extending rearwardly from adjacent said opening, a bracket member having a base adjustably secured to said mounting pad in different positions with respect to said top member opening, said bracket member providing an upstanding wall portion, a work-engaging element carrier providing a bearing for a vertically adjustable work-engaging element, and means in part provided by said carrier and in part by said upstanding bracket wall portion for securing the carrier in vertically adjusted positions on the wall portion with the carrier bearing aligned with said opening.

12. The structure of claim 11, and the carrier securing means which is provided by said bracket wall portion and carrier comprising vertically spaced interengageable transverse cleat and groove means for locating the carrier in predetermined adjusted positions in respect to said wall portion and for absorbing vertical stresses from a work-engaging member in said carrier bearing.

13. In a drill or arbor press providing a base and a superjacent support for the carrier of a work-engaging member, a work support, laterally spaced guide posts rising from said base, bearings carried by said work support and through which said posts extend whereby to slidably mount the work support, each of said posts having vertically and correspondingly spaced transversely extending surface recesses, and a separable section work support-sustaining member carried by and slidable on each of said posts independently of said work support, and each of said work support-sustaining members having inwardly extending lug means selectively engageable in said post recesses, whereby to support said work support in predetermined horizontal positions.

14. The structure of claim 13, and the upstanding bracket wall portion providing a vertically extending guideway in its face which is adjacent said top member opening, said guideway having a closed vertical slot extending therethrough, the rear face of said carrier having a flat-sided boss working in said guideway and engaging sides of the latter, and a bolt fixedly projecting from said boss and extending through said guideway to receive a clamp nut whereby to adjustably secure the carrier to said bracket wall portion.

15. In a drill or arbor press providing a base and a superjacent support for the carrier of a work-engaging member, a work support, laterally spaced guide posts rising from said base, one fixed and at least one detachable bearing providing guide carried by said work support and slidably mounting the latter on said posts, means including said bearing-providing guides for securing said work support at desired positions on said posts, said fixed support-carried guide being rotatable about its post as an axis whereby when the other guide is disconnected from the work support whereby the latter can be swung outwardly of the plane of said base, and cooperating means provided by the detachable work support-carried bearing-providing guide and its post for preventing relative rotation of same.

16. The structure of claim 15, and said detachable guide bearing and the adjacent portion of said work support having two alignable bearings, coupling pins working in said bearings and movable into the work support-provided bearings to release the detachable guide, and a finger piece providing operating connection between the inner ends of said coupling pins.

17. In a drill or arbor press providing a base and a superjacent support for the carrier of a work-engaging member, a work support, laterally spaced guide posts rising from said base, bearings carried by said work support and through which said posts extend whereby to slidably mount the work support, each of said posts having vertically and correspondingly spaced annular surface grooves, a work-support-sustaining collar slidable on each of said posts, each of said collars being transversely split to provide two sections and each collar section having an inwardly extending post groove-engaging lug means; and inwardly acting collar-carried and exteriorly positioned spring-like means tending to draw said collar sections together.

References Cited in the file of this patent

UNITED STATES PATENTS

| | | |
|---|---|---|
| 844,754 | Sardou et al. | Feb. 19, 1907 |
| 1,201,162 | Eames | Oct. 10, 1916 |
| 1,397,910 | Taylor | Nov. 22, 1921 |
| 1,418,435 | Gardiner | June 6, 1922 |
| 1,977,423 | Blazek et al. | Oct. 16, 1934 |
| 2,092,430 | Stratton | Sept. 7, 1937 |
| 2,360,921 | Wiken | Oct. 24, 1944 |
| 2,742,853 | Knelson | Apr. 24, 1956 |
| 2,960,263 | Goddard | Nov. 15, 1960 |

FOREIGN PATENTS

| | | |
|---|---|---|
| 164,689 | Austria | Dec. 10, 1949 |
| 2,693 | Great Britain | 1882 |
| 408,593 | Italy | Jan. 4, 1945 |